Jan. 17, 1950  W. J. EWBANK  2,495,095
STACKED DISK FILTER
Filed April 3, 1945  2 Sheets-Sheet 1

Inventor
WALTER J. EWBANK
By Semmes, Keegin, Beale + Semmes
attorneys

Jan. 17, 1950　　　　W. J. EWBANK　　　　2,495,095
STACKED DISK FILTER

Filed April 3, 1945　　　　　　　　　　　　2 Sheets—Sheet 2

Inventor
WALTER J. EWBANK
By Semmes, Keegin, Beale + Semmes
attorneys

Patented Jan. 17, 1950

2,495,095

UNITED STATES PATENT OFFICE 2,495,095

STACKED DISK FILTER

Walter J. Ewbank, Bethesda, Md., assignor, by mesne assignments, to The Briggs Filtration Company, Bethesda, Md., a corporation of Maryland Application April 3, 1945, Serial No. 586,371

3 Claims. (Cl. 210—169)

This invention relates to the art of filtration, and more particularly has reference to a cartridge for an oil filter having a maximum filtering surface. Specifically, the invention is an improvement upon one of the elements of the cartridge shown in co-pending application of Southwick W. Briggs, Serial No. 553,600, filed September 11, 1944, and now abandoned.

In that application there is disclosed a filter cartridge composed of a stack of elements to form in effect a tubular unit, and in which the elements are so arranged that a filtering disc is positioned between elements to expose the major area of such filtering disc to the oil to be filtered. Usually the oil passes generally from the outside of the tubular unit to the central bore thereof, and in this case the element upon one side of the filtering disc provides communication between the exterior of the cartridge and the major part of the flat surface of one side of the disc, while the element upon the opposite side of the disc provides communication between such opposite side and the interior bore of the cartridge.

I have observed a tendency for the cartridge to shrink over extended periods of use, and particularly when the oil that is being filtered has an appreciable moisture content; and, while provision is made for shrinkage of the cartridge by means of the floating plate disclosed in that application, it is preferred to maintain shrinkage at a minimum. This shrinkage develops longitudinally of the cartridge and is most pronounced adjacent the central bore. It is most noticeable when the element that is in communication with the exterior of the cartridge is of the form shown in Figure 8 of said application Serial No. 553,600, and the present invention is directed primarily to providing a substitute for that type of element. I believe that the shrinkage referred to is due principally to an inadequate amount of support afforded by said element adjacent the central bore, for it will be observed that an appreciable area is cut out of said element with the resulting decrease in the support that it would otherwise afford.

To meet this difficulty, my invention in general contemplates the use of an element having a substantial quantity of material adjacent the inner bore, and yet having a substantial cutaway section in order to expose a maximum surface area of the contiguous filter disc to the oil to be filtered. More specifically, this invention provides an element in which the outer annulus of the element of said application is omitted, and in which the inner annulus carries a plurality of outwardly extending radial webs. A sufficient number of such webs is provided to afford the necessary support adjacent the annulus, and such webs may taper toward their outer extremities in order to increase the exposed surface of the contiguous filter element.

There is represented in the accompanying drawings a specific embodiment of my inventive concept, it being understood of course that variations may be made therein without departing from the scope of my invention.

Figure 1:
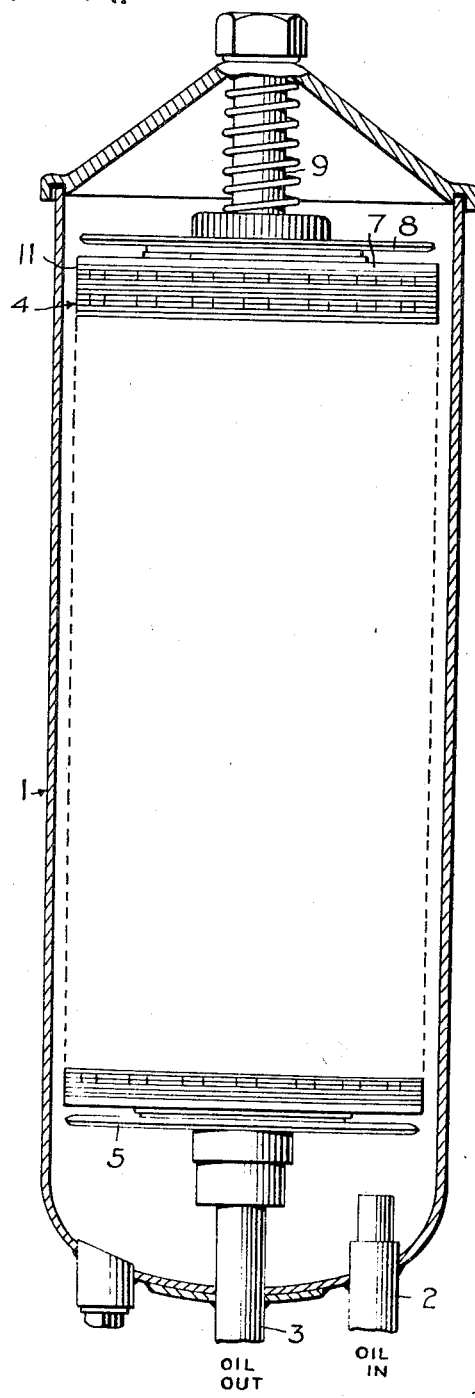
Figure 1 is a vertical view, partly in section and partly in elevation, of a filter, illustrating the arrangement of the cartridge therein.
Figure 2:
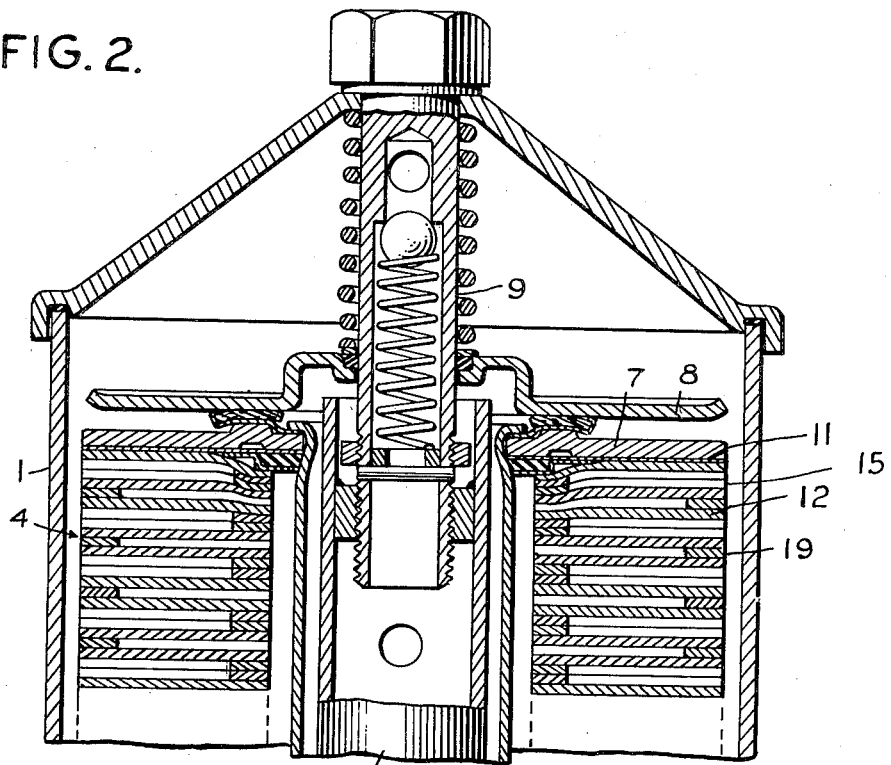
Figure 2 is a vertical, sectional view in detail of the top of the cartridge and its support.
Figure 4:
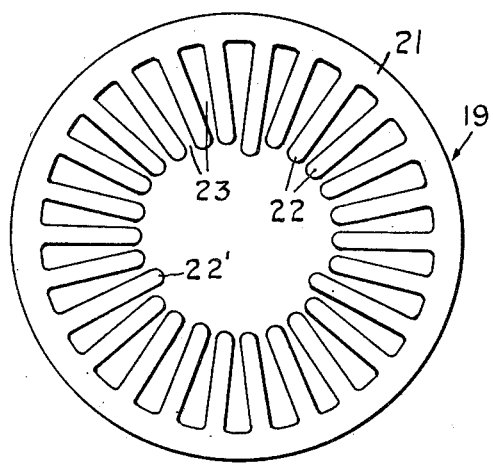
Figure 4 is a plan view of a drainage element for an outside-inside flow.

Referring particularly to Figures 1 and 2, there is shown a conventional form of casing 1 provided with an inlet tube 2 and a discharge tube 3. In the event that it is desired to effect filtration by having the oil pass from the inside of the cartridge to the outside, the functions of tubes 2 and 3 are, of course, reversed. The cartridge is indicated generally by the numeral 4 and is supported upon a base plate 5 mounted upon the discharge tube 3.

As best shown in Figure 2, the discharge tube 3 extends to a point adjacent the top of the filter casing and is provided with suitable discharge ports as shown. The filter cartridge is provided with a center tube 6 (having discharge ports therein, not shown) and there is secured at its upper end a top plate 7. The cartridge is held between the base plate 5 and an upper plate 8 which is resiliently mounted upon cover screw 9. Obviously other means of mounting the cartridge within the casing may be employed.

In the drawings I have shown the cartridge provided with a floating top plate 11, which is the subject matter of co-pending application of Southwick W. Briggs, Serial No. 549,242, filed August 12, 1944, and which subsequently issued as Patent No. 2,454,033. The floating top plate 11 supports a gasket which engages the outer wall of the central tube 6 in a fluid tight fit to prevent any by-passing of the oil between top plate 7 and the top of the filter cartridge. Plate 11 is free to slide upon the center tube between the filter cartridge and the top plate 7. Upon any shrinkage of the carriage, the plate 11 is forced downwardly by the fluid between it and the top plate 7 and remains in contact with the end of the filter cartridge.

Figure 3:
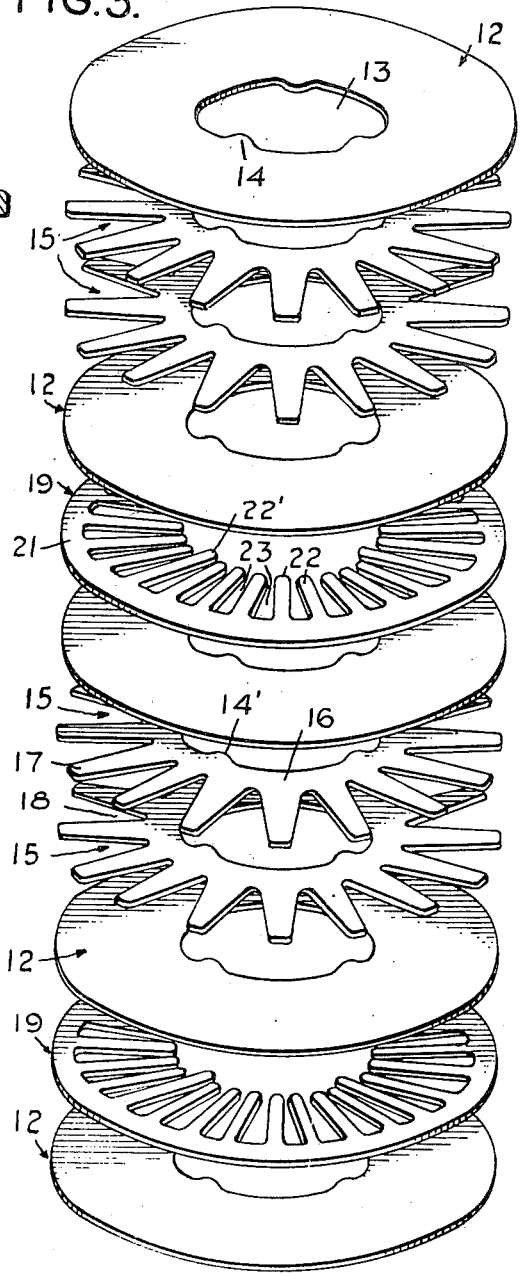
Figure 3 is an exploded view of a section of the cartridge showing the several component elements.

As best shown in Figures 2 and 3, the cartridge is made up of a stack of superimposed elements arranged to form a unitary cylinder. Specifically, there are a number of filter discs 12 composed of a suitable filtering material. I prefer to use a cellulosic felt having the desired porosity, strength, and other characteristics suitable for the filtration of oil. Each of these discs is provided with a central aperture 13, and tabs 14 project inwardly to contact the center tube 6 and center the discs with respect thereto.

Figure 5:
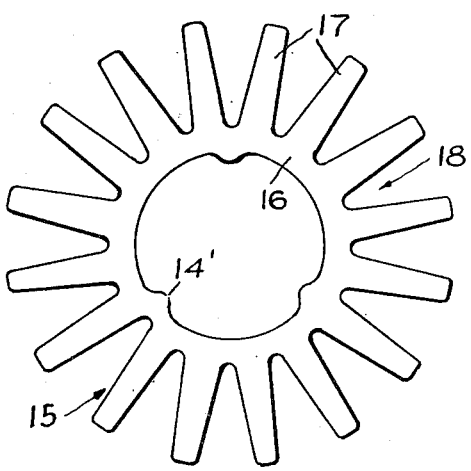
Figure 5 is a plan view in detail of the improved type of spacer or inlet element for an outside-inside flow.

Upon one side of each of the filter discs 12 there are provided one or more spacer or inlet elements designated generally 15. In the drawings I have shown a pair of such elements for each filter disc, but the precise number may be varied in accordance with the particular operation contemplated. Referring more particularly to Figure 5, the spacer or inlet disc is composed of a hub or annulus 16, with the inner periphery corresponding to the aperture 13, and likewise provided with projections 14'. The spacer is aligned with respect to the filter disc 12 to form the central bore of the completed cartridge. Extending radially from the annulus 16 are a plurality of webs 17 which extend to a distance corresponding to the outer periphery of the filter disc 12. These webs preferably taper toward their outer extremities to thereby increase the outer area 18 between adjacent webs and at the same time afford additional strength adjacent the central bore.

The spacer element 15 may be composed of any suitable material having sufficient strength to support the contiguous filter disc 12 and prevent a collapse of the cartridge. For instance, the disc may be formed of a plastic, and such a permanent type of material is preferred where it is desired to reclaim the spacer element for future use. On the other hand, the spacer may be made of less durable material, and in this connection I have found that a spacer made of the same material as the filter disc 12 has certain advantages in that it is thereby possible to filter a certain amount of the oil from the base of the area 18 through the annulus to the central bore of the cylinder.

The number of webs 17 for any single spacer is optional, but a sufficient number should be provided to insure adequate support for the filter discs 12, and it is for this reason that I prefer to taper the web 17 in order to provide the maximum web area adjacent the annulus 6. As previously pointed out, I find that shrinkage and collapse of a cylinder occurs principally in the area adjacent the central bore, and I have discovered that if spacer elements of sufficient strength near the center are provided such shrinkage and collapse are maintained at a minimum. Consequently, I provide an annulus 16 of sufficient width and a sufficient number of webs 17, each of a desired width at its base to adequately support the filter discs. Obviously, however, the width of the annulus and of the webs would be no greater than the margin of safety requires, for the desideratum is to secure the maximum area 18 and at the same time provide ample support.

By a spacer such as disclosed herein, a relatively large surface of the filter disc is exposed to the incoming oil. The aggregate of the areas 18 is appreciable, and consequently the flow rate through the filter is thereby increased. It will be noted that the outer annulus, such as disclosed in the said application Serial No. 553,600 is eliminated in the construction of the present spacer element; additional strength is provided adjacent the central bore of the filter; and adequate support is given the filter discs throughout their complete radius.

On the opposite side of each filter disc from the spacer discs there is provided a drainage disc indicated generally by the numeral 19. This drainage disc is composed of an annulus 21 having an outside periphery corresponding to the outside of the cartridge. Projecting inwardly from the annulus 21 are a plurality of webs 22 to form drainage channels 23. The webs 22 terminate at the inner periphery of the cylinder and the drainage channels 23 receive oil after passage through the filter disc and direct it to the central bore of the cartridge. Certain of the webs 22' may extend inwardly a greater distance than the others to abut against the center tube 6 and thereby center the drainage element.

The operation of the filter here disclosed is believed to be apparent. For an outside-inside filtration the contaminated oil enters the casing through inlet pipe 2 and completely fills the inside of the casing. Such oil flows into the area 18 of the spacer element, and then passes through the filter disc 12, axially of the cartridge, and into the areas 23 of the drainage element on the opposite side of the filter disc. If the spacer and drainage elements are made of the same material as the filter discs, a certain amount of the oil will pass radially through the annuli 16 and 21, respectively, but even in this event it will be appreciated that such oil is subjected to a filtering action. After passage into the central bore of the cartridge, the filtered oil then flows through the apertures in the center tube 6 and the discharge tube 3 and back to the lubricating system.

The cartridge herein disclosed has a large filtering area and thereby effects a high flow rate for the particular material of the filter discs 12. Shrinkage of the cartridge is reduced to a minimum, but even with such shrinkage there is little danger of collapse of the cartridge. This results from the strength of the spacer elements 15 and the mass of material in the spacer element adjacent the central aperture. This increase of mass, however, is at no comparable expense to the area of the filter discs which are exposed to the incoming oil.

While I have shown and described the preferred embodiment of my invention, I wish it to be understood that I do not confine myself to the precise details of construction herein set forth by way of illustration, but may be limited only by the appended claims.

I claim:

1. A filter cartridge comprising a series of centrally apertured discs stacked to form a tubular cartridge with a central bore, certain of the discs being of a first type constituting filter discs, other of the discs being of a second type positioned adjacent one side of each filter disc, channels in the discs of the second type communicating with the bore of the cartridge, and other of the discs being of a third type positioned adjacent each filter disc on the side of the filter disc opposite the disc of the second type, said disc of the third type consisting of a single annulus surrounding the central bore of the cartridge having webs tapered outwardly in width extending generally radially outwardly from the annulus of the discs of the third type to the outer periphery of the cartridge whereby the mass of the discs is concentrated near the center of the cartridge to reduce the longitudinal shrinkage of the cartridge during its use.

2. A filter cartridge comprising a series of centrally apertured discs stacked to form a tubular cartridge with a central bore, certain of said discs being annular discs of a first type having their inner edge in alignment with the central bore of the cartridge and their outer edge in alignment with the outer periphery of the cartridge constituting filter discs, other of the discs being of a second type positioned adjacent one side of each filter disc, channels in the discs of the second type communicating with the central bore of the cartridge, and other of the discs being of a third type positioned adjacent each filter disc on the side of the filter disc opposite the disc of the second type, said disc of the third type consisting of an inner annulus surrounding the central bore of the cartridge having webs tapering outwardly in width extending generally radially from the annulus to the outer periphery of the cartridge and having adjacent webs substantially contiguous at their juncture with the inner annulus to concentrate the mass of the discs near the center of the cartridge and thereby decrease longitudinal shrinkage of the cartridge during its use.

3. A filter cartridge comprising a plurality of centrally apertured discs stacked to form a tubular cartridge with a central bore, certain of said discs being of a first type constituting a filter disc, other of the discs being of a second type consisting of an outer unbroken annulus having its outer edge forming a portion of the outer surface of the cartridge and a plurality of spaced fingers extending inwardly from the inner edge of the annulus to the central bore to form channels communicating with the central bore, other of the discs being of a third type consisting of an inner annulus surrounding the central bore of the cartridge and having webs tapering in width outwardly extending from the annulus to the outer periphery of the cartridge to concentrate the mass of the filter cartridge near the central bore thereby reducing longitudinal shrinkage of the cartridge during its use, said discs of the second type and discs of the third type being stacked in alternating relationship to each other, and a disc of the first type between the discs of the third type and the discs of the second type.

WALTER J. EWBANK.

REFERENCES CITED

The following references are of record in the file of this patent:

UNITED STATES PATENTS

| Number | Name | Date |
|---|---|---|
| 1,793,583 | Bowden | Feb. 24, 1931 |
| 1,977,174 | Crawford | Oct. 16, 1934 |
| 2,190,014 | Colas | Feb. 13, 1940 |
| 2,339,703 | Kamrath | Jan. 18, 1944 |
| 2,359,475 | Gauthier | Oct. 3, 1944 |
| 2,372,865 | Taylor | Apr. 3, 1945 |

FOREIGN PATENTS

| Number | Country | Date |
|---|---|---|
| 803,101 | France | June 29, 1936 |
| 371,354 | Italy | May 20, 1939 |